(12) United States Patent
Yamaoka et al.

(10) Patent No.: US 6,819,382 B2
(45) Date of Patent: Nov. 16, 2004

(54) METHOD FOR PRODUCING SUBSTRATE OF LIQUID CRYSTAL CELL AND METHOD FOR PRODUCING LIQUID CRYSTAL PANEL

(75) Inventors: Takashi Yamaoka, Ibaraki (JP); Nao Murakami, Ibaraki (JP); Hiroyuki Yoshimi, Ibaraki (JP); Tatsuki Nagatsuka, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 0 days.

(21) Appl. No.: 10/348,329

(22) Filed: Jan. 22, 2003

(65) Prior Publication Data

US 2004/0100599 A1 May 27, 2004

(30) Foreign Application Priority Data

Jan. 24, 2002 (JP) ........................................ 2002-015609

(51) Int. Cl.$^7$ ................................................. G02F 1/13
(52) U.S. Cl. ........................................ 349/117; 349/122
(58) Field of Search ................................. 349/117, 122, 349/158

(56) References Cited

U.S. PATENT DOCUMENTS

| | | | |
|---|---|---|---|
| 4,985,285 A | * 1/1991 | Ichikawa et al. | 428/1.31 |
| 5,344,916 A | 9/1994 | Harris et al. | 528/353 |
| 5,395,918 A | 3/1995 | Harris et al. | 528/353 |
| 5,480,964 A | 1/1996 | Harris et al. | 528/353 |
| 5,580,950 A | 12/1996 | Harris et al. | 528/350 |
| 5,694,187 A | 12/1997 | Abileah et al. | 349/120 |
| 5,750,641 A | 5/1998 | Ezzell et al. | 528/353 |
| 5,907,378 A | 5/1999 | Abileah et al. | 349/123 |
| 6,028,651 A | 2/2000 | Abileah et al. | 349/123 |
| 6,074,709 A | 6/2000 | Ezzell et al. | 428/1.3 |
| 6,184,968 B1 | * 2/2001 | Taylor-Smith | 349/158 |

FOREIGN PATENT DOCUMENTS

| | | |
|---|---|---|
| EP | 1 160 591 | 12/2001 |
| JP | 8-511812 | 12/1996 |
| JP | 10-508048 | 8/1998 |
| JP | 2000-511296 | 8/2000 |
| JP | 2001-49110 | 2/2001 |
| JP | 2001-343529 | 12/2001 |
| WO | WO 94/24191 | 10/1994 |
| WO | WO 96/11967 | 4/1996 |
| WO | WO 97/44704 | 11/1997 |
| WO | WO 01/37007 | 5/2001 |

* cited by examiner

Primary Examiner—James A. Dudek
(74) Attorney, Agent, or Firm—Westerman, Hattori, Daniels & Adrian LLP

(57) ABSTRACT

By a method for producing a liquid crystal cell substrate having a base and a birefringent layer, which includes producing a precursor layer of the birefringent layer by applying a solution of a polymer that hardens to form the birefringent layer, directly onto one surface of the base, and producing the birefringent layer by hardening the precursor layer, the present invention provides a method for producing a birefringent layer on a liquid crystal cell substrate or a liquid crystal cell substrate of a liquid crystal panel used in a liquid crystal display.

20 Claims, 2 Drawing Sheets

METHOD FOR PRODUCING SUBSTRATE OF LIQUID CRYSTAL CELL AND METHOD FOR PRODUCING LIQUID CRYSTAL PANEL

BACKGROUND OF THE INVENTION

1. Field of the Invention

The present invention relates to a method for producing a liquid crystal cell substrate and a method for producing a liquid crystal panel.

2. Description of Related Art

Conventionally, birefringent layers for optical compensation in various liquid crystal displays have been formed by stretching and orienting a polymer film or fixing orientation of a liquid crystal compound or a liquid crystal polymer.

Furthermore, U.S. Pat. Nos. 5,344,916, 5,395,918, 5,480,964, 5,580,950, 5,694,187 and 5,750,641 disclose a production method of coating an inorganic compound base (an SUS belt, a copper sheet, a glass sheet, an Si wafer or the like) with a polymer such as polyamide, polyimide, polyester, polyetherketone, polyamide imide or polyesterimide and a method for producing an optical retardation film serving as a negative birefringent layer by coating an Si wafer with polyimide.

Moreover, U.S. Pat. No. 6,074,709 discloses a production method of laminating a polyimide layer on a support such as a glass sheet, an optically isotropic polymer layer, an anisotropic polymer layer or an anisotropic ceramic layer.

For providing the birefringent layer produced as above in a liquid crystal display, the birefringent layer is integrated with a polarizing plate and then attached to a liquid crystal cell or attached to external sides of substrates that sandwich a liquid crystal. Further, U.S. Pat. No. 5,907,378 and U.S. Pat. No. 6,028,651 have reported that a birefringent layer formed of polyimide is attached to internal sides of substrates that sandwich a liquid crystal, and serves as both an oriented film and a birefringent layer.

However, providing such a birefringent layer formed of polyimide or the like in a liquid crystal cell usually requires complicated processes because an integrated layer of the birefringent layer and the polarizing plate is formed first and then attached to external sides of the cell via a sticking agent. Consequently, there has been a problem of an increased overall thickness. Also, there has been a problem that, when the birefringent layer formed of polyimide or the like is attached onto the cell via an adhesive, the birefringent layer peels off by heat.

Additionally, in the case of forming a birefringent layer serving as both an oriented film and a birefringent layer on the internal sides of the cell, since a currently available material has a small birefringence with respect to thickness, such a layer needs to have a thickness of at least 1 $\mu$m to function as a birefringent layer. In this case, a natural modulus of elasticity of the film not only causes an adjusting agent to fill up in the film at the time of adjusting a cell gap and, thus, a gap adjustment cannot be made, but also changes the retardation of the birefringent layer, so that uniformity is lost, which causes the problem that an actual use is extremely difficult.

SUMMARY OF THE INVENTION

In order to achieve the above-mentioned object, the present invention provides a method for producing a liquid crystal cell substrate including a base and a birefringent layer. The method includes producing a precursor layer of the birefringent layer by applying a solution of a polymer that hardens to form the birefringent layer, directly onto one surface of the base, and producing the birefringent layer by hardening the precursor layer.

Also, the present invention provides a method for producing a liquid crystal panel having a birefringent layer on one of surfaces of a liquid crystal cell. The method includes preparing the liquid crystal cell including two liquid crystal cell substrates and a liquid crystal layer interposed between the two liquid crystal cell substrates, producing a precursor layer of the birefringent layer by applying a solution of a polymer that hardens to form the birefringent layer, directly onto at least one surface of the two liquid crystal cell substrates, and producing the birefringent layer by hardening the precursor layer.

DESCRIPTION OF THE PREFERRED EMBODIMENTS

Figure 1:
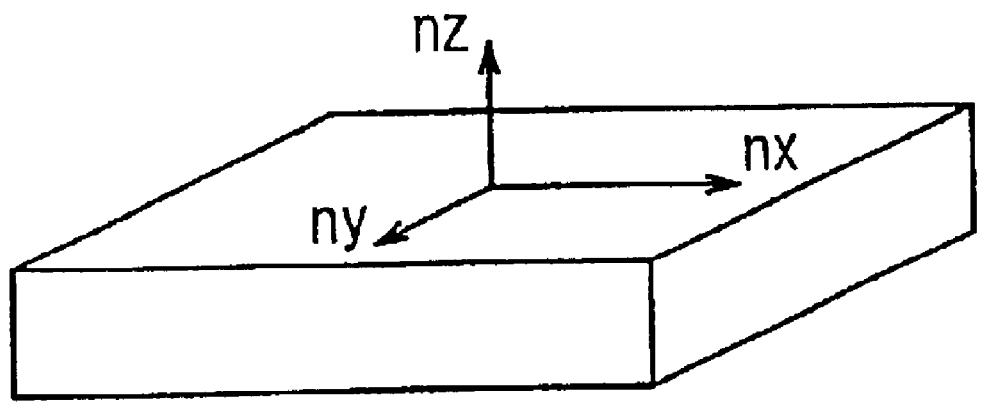
FIG. 1 shows axial directions of a birefringent layer.

It is preferable that a base used in the present invention is formed of glass or plastic of polyester, polyarylate, polycarbonate, polysulfone, polyethersulfone, an epoxy resin or polynorbornene.

Although a polymer used in the present invention is not specifically limited as long as it hardens to form a birefringent layer, it preferably is a polymer such as polyamide, polyimide, polyester, polyetherketone, polyaryletherketone, polyamide imide and polyesterimide because of its excellent heat resistance, chemical resistance, transparency and hardness. It may be possible to use one of these polymers alone or a mixture of two or more polymers, for example, a mixture of polyetherketone and polyamide. Among these polymers, polyimide is particularly preferable because a high birefringence can be obtained.

The molecular weight of the above-mentioned polymer is not particularly limited, but the weight-average molecular weight (Mw) thereof preferably ranges from 1,000 to 1,000,000 and more preferably ranges from 2,000 to 500,000.

More specifically, as the above-mentioned polymer, polyamide, polyimide, polyester, polyetherketone, polyaryletherketone, polyamide imide or polyesterimide disclosed in U.S. Pat. Nos. 5,344,916, 5,395,918, 5,480,964, 5,580,950, 5,694,187, 5,750,641 and 6,074,709 may be used alone or in arbitrary combination.

As the polyimide, it is preferable to use a polyimide that has a high in-plane orientation and is soluble in an organic solvent. For example, it is possible to use a condensation polymer of 9,9-bis(aminoaryl)fluorene and an aromatic tetracarboxylic dianhydride disclosed in JP 2000-511296 A, more specifically, a polymer containing at least one repeating unit represented by the formula (1) below.

(1)

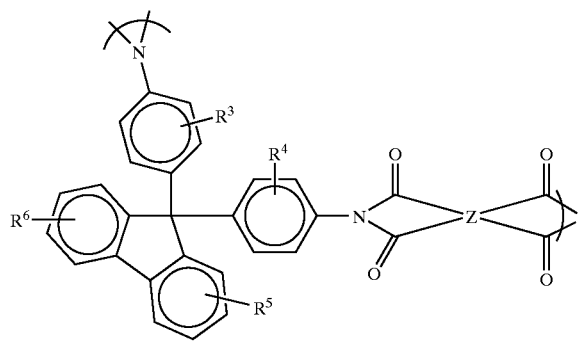

(3)

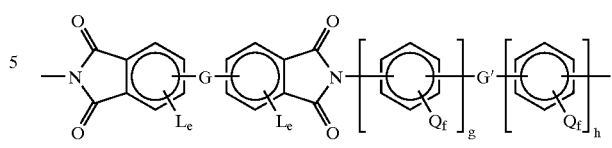

(4)

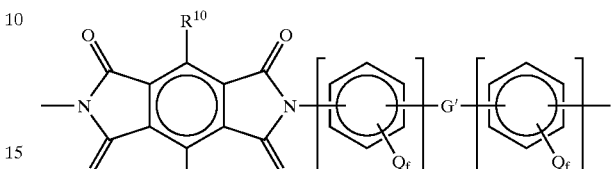

(5)

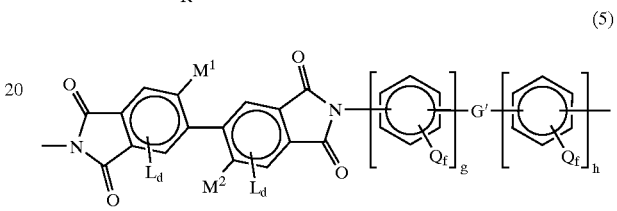

In the above formula (1), $R^3$ to $R^6$ are at least one substituent selected independently from the group consisting of hydrogen, halogen, a phenyl group, a phenyl group substituted with 1 to 4 halogen atoms or a $C_{1-10}$ alkyl group, and a $C_{1-10}$ alkyl group. Preferably, $R^3$ to $R^6$ are at least one substituent selected independently from the group consisting of halogen, a phenyl group, a phenyl group substituted with 1 to 4 halogen atoms or a $C_{1-10}$ alkyl group, and a $C_{1-10}$ alkyl group.

In the above formula (1), Z is, for example, a $C_{6-20}$ quadrivalent aromatic group, and preferably is a pyromellitic group, a polycyclic aromatic group, a derivative of a polycyclic aromatic group or a group represented by the formula (2) below.

(2)

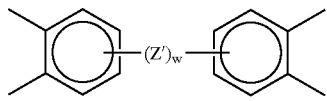

In the formula (2) above, Z' is, for example, a covalent bond, a $C(R^7)_2$ group, a CO group, an O atom, an S atom, an $SO_2$ group, an $Si(C_2H_5)_2$ group or an $NR^8$ group. When there are plural Z's, they may be the same or different. Also, w is an integer from 1 to 10. $R^7$s independently are hydrogen or $C(R^9)_3$. $R^8$ is hydrogen, an alkyl group having from 1 to about 20 carbon atoms or a $C_{6-20}$ aryl group, and when there are plural $R^8$s, they may be the same or different. $R^9$s independently are hydrogen, fluorine or chlorine.

The above-mentioned polycyclic aromatic group may be, for example, a quadrivalent group derived from naphthalene, fluorene, benzofluorene or anthracene. Further, a substituted derivative of the above-mentioned polycyclic aromatic group may be the above-mentioned polycyclic aromatic group substituted with at least one group selected from the group consisting of, for example, a $C_{1-10}$ alkyl group, a fluorinated derivative thereof and halogen such as F and Cl.

Other than the above, homopolymer whose repeating unit is represented by the general formula (3) or (4) below or polyimide whose repeating unit is represented by the general formula (5) below disclosed in JP 8(1996)-511812 A may be used, for example. The polyimide represented by the formula (5) below is a preferable mode of the homopolymer represented by the formula (3).

In the above general formulae (3) to (5), G and G' each are a group selected independently from the group consisting of, for example, a covalent bond, a $CH_2$ group, a $C(CH_3)_2$ group, a $C(CF_3)_2$ group, a $C(CX_3)_2$ group (wherein X is halogen), a CO group, an O atom, an S atom, an $SO_2$ group, an $Si(CH_2CH_3)_2$ group and an $N(CH_3)$ group, and G and G' may be the same or different.

In the above formulae (3) and (5), L is a substituent, and d and e indicate the number of substitutions therein. L is, for example, halogen, a $C_{1-3}$ alkyl group, a halogenated $C_{1-3}$ alkyl group, a phenyl group or a substituted phenyl group, and when there are plural Ls, they may be the same or different. The above-mentioned substituted phenyl group may be, for example, a substituted phenyl group having at least one substituent selected from the group consisting of halogen, a $C_{1-3}$ alkyl group and a halogenated $C_{1-3}$ alkyl group. Also, the above-mentioned halogen may be, for example, fluorine, chlorine, bromine or iodine. d is an integer from 0 to 2, and e is an integer from 0 to 3.

In the above formulae (3) to (5), Q is a substituent, and f indicates the number of substitutions therein. Q may be, for example, an atom or a group selected from the group consisting of hydrogen, halogen, an alkyl group, a substituted alkyl group, a nitro group, a cyano group, a thioalkyl group, an alkoxy group, an aryl group, a substituted aryl group, an alkyl ester group and a substituted alkyl ester group and, when there are plural Qs, they may be the same or different. The above-mentioned halogen may be, for example, fluorine, chlorine, bromine or iodine. The above-mentioned substituted alkyl group may be, for example, a halogenated alkyl group. Also, the above-mentioned substituted aryl group may be, for example, a halogenated aryl group. f is an integer from 0 to 4, and g and h respectively are an integer from 0 to 3 and an integer from 1 to 3. Furthermore, it is preferable that g and h are larger than 1.

In the above formula (4), $R^{10}$ and $R^{11}$ are groups selected independently from the group consisting of hydrogen, halogen, a phenyl group, a substituted phenyl group, an alkyl group and a substituted alkyl group. It is particularly preferable that $R^{10}$ and $R^{11}$ independently are a halogenated alkyl group.

In the above formula (5), $M^1$ and $M^2$ may be the same or different and, for example, halogen, a $C_{1-3}$ alkyl group, a halogenated $C_{1-3}$ alkyl group, a phenyl group or a substituted phenyl group. The above-mentioned halogen may be, for example, fluorine, chlorine, bromine or iodine. The above-mentioned substituted phenyl group may be, for example, a substituted phenyl group having at least one substituent selected from the group consisting of halogen, a $C_{1-3}$ alkyl group and a halogenated $C_{1-3}$ alkyl group.

A specific example of polyimide represented by the formula (3) includes polyimide represented by the formula (6) below.

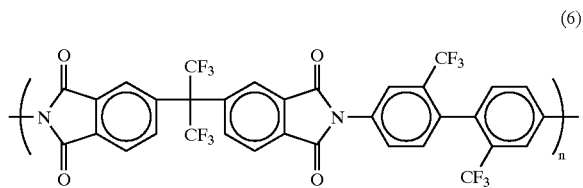

(6)

Moreover, the above-mentioned polyimide may be, for example, copolymer obtained by copolymerizing acid dianhydride and diamine other than the above-noted skeleton (the repeating unit) suitably.

The above-mentioned acid dianhydride may be, for example, aromatic tetracarboxylic dianhydride. The aromatic tetracarboxylic dianhydride may be, for example, pyromellitic dianhydride, benzophenone tetracarboxylic dianhydride, naphthalene tetracarboxylic dianhydride, heterocyclic aromatic tetracarboxylic dianhydride or 2,2'-substituted biphenyl tetracarboxylic dianhydride.

The pyromellitic dianhydride may be, for example, pyromellitic dianhydride, 3,6-diphenyl pyromellitic dianhydride, 3,6-bis(trifluoromethyl)pyromellitic dianhydride, 3,6-dibromopyromellitic dianhydride or 3,6-dichloropyromellitic dianhydride. The benzophenone tetracarboxylic dianhydride may be, for example, 3,3',4,4'-benzophenone tetracarboxylic dianhydride, 2,3,3',4'-benzophenone tetracarboxylic dianhydride or 2,2',3,3'-benzophenone tetracarboxylic dianhydride. The naphthalene tetracarboxylic dianhydride may be, for example, 2,3,6,7-naphthalene-tetracarboxylic dianhydride, 1,2,5,6-naphthalene-tetracarboxylic dianhydride or 2,6-dichloro-naphthalene-1,4,5,8-tetracarboxylic dianhydride. The heterocyclic aromatic tetracarboxylic dianhydride may be, for example, thiophene-2,3,4,5-tetracarboxylic dianhydride, pyrazine-2,3,5,6-tetracarboxylic dianhydride or pyridine-2,3,5,6-tetracarboxylic dianhydride. The 2,2'-substituted biphenyl tetracarboxylic dianhydride may be, for example, 2,2'-dibromo-4,4',5,5'-biphenyl tetracarboxylic dianhydride, 2,2'-dichloro-4,4',5,5'-biphenyl tetracarboxylic dianhydride or 2,2'-bis(trifluoromethyl)-4,4',5,5'-biphenyl tetracarboxylic dianhydride.

Other examples of the aromatic tetracarboxylic dianhydride may include 3,3',4,4'-biphenyl tetracarboxylic dianhydride, bis(2,3-dicarboxyphenyl)methane dianhydride, bis(2,5,6-trifluoro-3,4-dicarboxyphenyl)methane dianhydride, 2,2-bis(3,4-dicarboxyphenyl)-1,1,1,3,3,3-hexafluoropropane dianhydride, 4,4'-(3,4-dicarboxyphenyl)-2,2-diphenylpropane dianhydride, bis(3,4-dicarboxyphenyl) ether dianhydride, 4,4'-oxydiphthalic dianhydride, bis(3,4-dicarboxyphenyl)sulfonic dianhydride, (3,3',4,4'-diphenylsulfone tetracarboxylic dianhydride), 4,4'-[4,4'-isopropylidene-di(p-phenyleneoxy)]bis(phthalic dianhydride), N,N-(3,4-dicarboxyphenyl)-N-methylamine dianhydride and bis(3,4-dicarboxyphenyl)diethylsilane dianhydride.

Among the above, the aromatic tetracarboxylic dianhydride preferably is 2,2'-substituted biphenyl tetracarboxylic dianhydride, more preferably is 2,2'-bis(trihalomethyl)-4,4', 5,5'-biphenyl tetracarboxylic dianhydride, and further preferably is 2,2'-bis(trifluoromethyl)-4,4',5,5'-biphenyl tetracarboxylic dianhydride.

The above-mentioned diamine may be, for example, aromatic diamine. Specific examples thereof include benzenediamine, diaminobenzophenone, naphthalenediamine, heterocyclic aromatic diamine and other aromatic diamines.

The benzenediamine may be, for example, diamine selected from the group consisting of benzenediamines such as o-, m- and p-phenylenediamine, 2,4-diaminotoluene, 1,4-diamino-2-methoxybenzene, 1,4-diamino-2-phenylbenzene and 1,3-diamino-4-chlorobenzene. Examples of the diaminobenzophenone may include 2,2'-diaminobenzophenone and 3,3'-diaminobenzophenone. The naphthalenediamine may be, for example, 1,8-diaminonaphthalene or 1,5-diaminonaphthalene. Examples of the heterocyclic aromatic diamine may include 2,6-diaminopyridine, 2,4-diaminopyridine and 2,4-diamino-S-triazine.

Further, other than the above, the aromatic diamine may be 4,4'-diaminobiphenyl, 4,4'-diaminodiphenyl methane, 4,4'-(9-fluorenylidene)-dianiline, 2,2'-bis(trifluoromethyl)-4,4'-diaminobiphenyl, 3,3'-dichloro-4,4'-diaminodiphenyl methane, 2,2'-dichloro-4,4'-diaminobiphenyl, 2,2',5,5'-tetrachlorobenzidine, 2,2-bis(4-aminophenoxyphenyl) propane, 2,2-bis(4-aminophenyl)propane, 2,2-bis(4-aminophenyl)-1,1,1,3,3,3-hexafluoropropane, 4,4'-diamino diphenyl ether, 3,4'-diamino diphenyl ether, 1,3-bis(3-aminophenoxy)benzene, 1,3-bis(4-aminophenoxy)benzene, 1,4-bis(4-aminophenoxy)benzene, 4,4'-bis(4-aminophenoxy)biphenyl, 4,4'-bis(3-aminophenoxy)biphenyl, 2,2-bis [4-(4-aminophenoxy)phenyl]propane, 2,2-bis [4-(4-aminophenoxy)phenyl]-1,1,1,3,3,3,-hexafluoropropane, 4,4'-diamino diphenyl thioether or 4,4'-diaminodiphenylsulfone.

The polyetherketone as a material for forming the birefringent layer may be, for example, polyaryletherketone represented by the general formula (7) below, which is disclosed in JP 2001-49110 A.

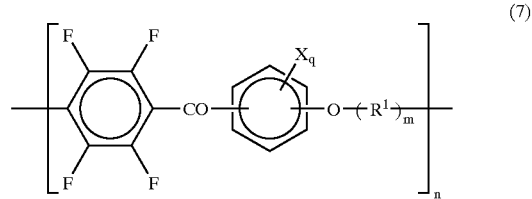

(7)

In the above formula (7), X is a substituent, and q is the number of substitutions therein. X is, for example, a halogen atom, a lower alkyl group, a halogenated alkyl group, a lower alkoxy group or a halogenated alkoxy group, and when there are plural Xs, they may be the same or different.

The halogen atom may be, for example, a fluorine atom, a bromine atom, a chlorine atom or an iodine atom, and among these, a fluorine atom is preferable. The lower alkyl group preferably is a $C_{1-6}$ lower straight alkyl group or a $C_{1-0}$ lower branched alkyl group and more preferably is a $C_{1-4}$ straight or branched chain alkyl group, for example. More specifically, it preferably is a methyl group, an ethyl group, a propyl group, an isopropyl group, a butyl group, an isobutyl group, a sec-butyl group or a tert-butyl group, and particularly preferably is a methyl group or an ethyl group. The halogenated alkyl group may be, for example, a halide of the above-mentioned lower alkyl group such as a trifluoromethyl group. The lower alkoxy group preferably is a $C_{1-6}$ straight or branched chain alkoxy group and more preferably is a $C_{1-4}$ straight or branched chain alkoxy group, for example. More specifically, it further preferably is a methoxy group, an ethoxy group, a propoxy group, an isopropoxy group, a butoxy group, an isobutoxy group, a sec-butoxy group or a tert-butoxy group, and particularly preferably is a methoxy group or an ethoxy group. The halogenated alkoxy group may be, for example, a halide of the above-mentioned lower alkoxy group such as a trifluoromethoxy group.

In the above formula (7), q is an integer from 0 to 4. In the formula (7), it is preferable that q=0 and a carbonyl group and an oxygen atom of an ether that are bonded to both ends of a benzene ring are present at para positions.

Also, in the above formula (7), $R^1$ is a group represented by the formula (8) below, and m is an integer of 0 or 1.

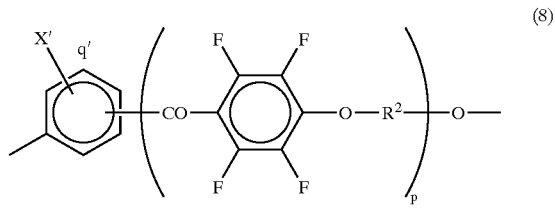

(8)

In the above formula (8), X' is a substituent and is the same as X in the formula (7), for example. In the formula (8), when there are plural X's, they may be the same or different. q' indicates the number of substitutions in the X' and is an integer from 0 to 4, preferably, q'=0. In addition, p is an integer of 0 or 1.

In the formula (8), $R^2$ is a divalent aromatic group. This divalent aromatic group is, for example, an o-, m- or p-phenylene group or a divalent group derived from naphthalene, biphenyl, anthracene, o-, m- or p-terphenyl, phenanthrene, dibenzofuran, biphenyl ether or biphenyl sulfone. In these divalent aromatic groups, hydrogen that is bonded directly to the aromatic may be substituted with a halogen atom, a lower alkyl group or a lower alkoxy group. Among them, the $R^2$ preferably is an aromatic group selected from the group consisting of the formulae (9) to (15) below.

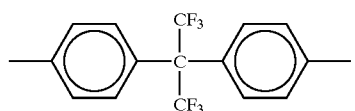

(9)

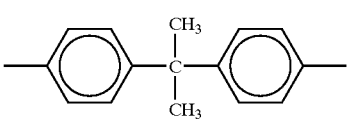

(10)

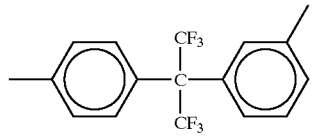

(11)

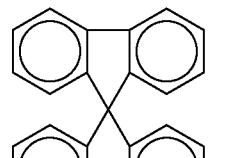

(12)

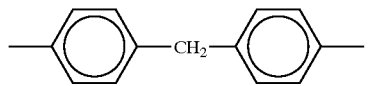

(13)

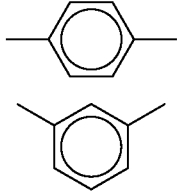

(14)

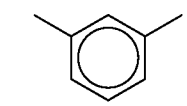

(15)

In the above formula (7), the $R^1$ preferably is a group represented by the formula (16) below, wherein $R^2$ and p are equivalent to those in the above-noted formula (8).

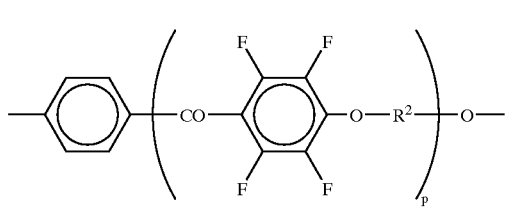

(16)

Futhermore, in the formula (7), n indicates a degree of polymerization ranging for example, from 2 to 5000 and preferably from 5 to 500. The polymerization may be composed of repeating units with the polymerization form of the repeating units may be a block polymerization or a random polymerization.

Moreover, it is preferable that an end on a p-tetrafluorobenzoylene group side of the polyaryletherketone represented by the formula (7) is fluorine and an end on an oxyalkylene group side thereof is a hydrogen atom. Such a polyaryletherketone can be represented by the general formula (17) below. In the formula below, n indicates a degree of polymerization as in the formula (7).

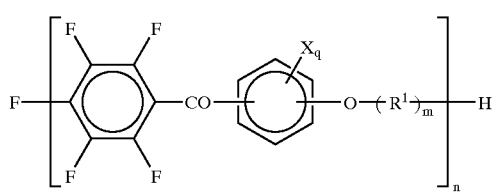

(17)

Specific examples of the polyaryletherketone represented by the formula (7) may include those represented by the formulae (18) to (21) below, wherein n indicates a degree of polymerization as in the formula (7).

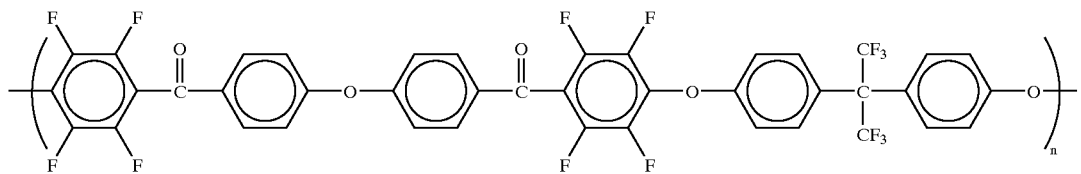

(18)

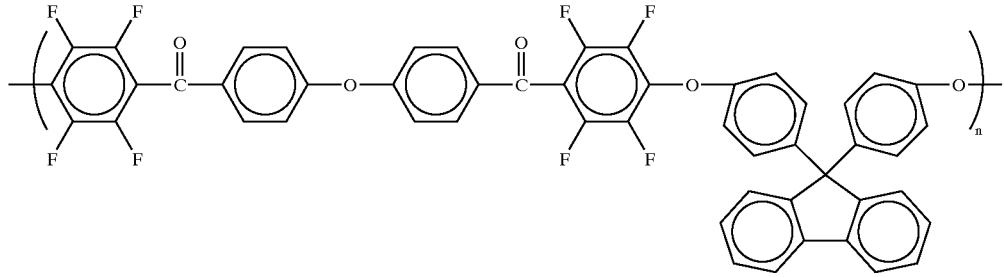

(19)

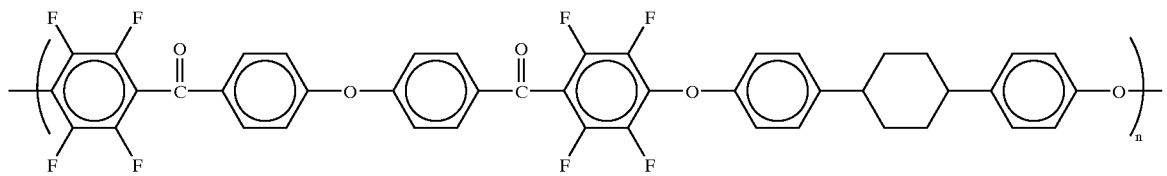

(20)

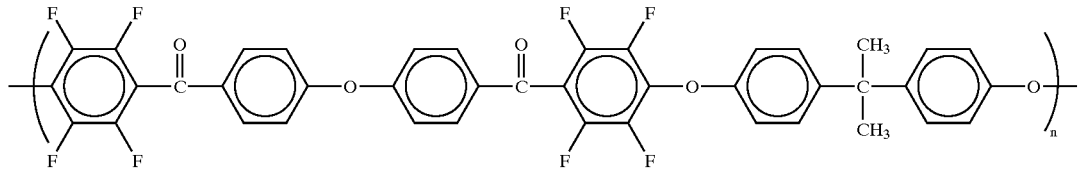

(21)

Other than the above, the polyamide or polyester as a material for forming the birefringent layer may be, for example, polyamide or polyester described by JP 10(1998)-508048 A, and their repeating units can be represented by the general formula (22) below.

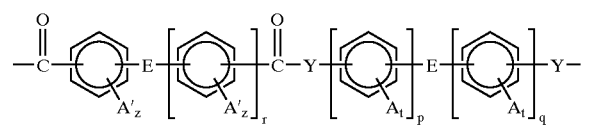

(22)

In the above formula (22), Y is O or NH. E is, for example, at least one group selected from the group consisting of a covalent bond, a $C_2$ alkylene group, a halogenated $C_2$ alkylene group, a $CH_2$ group, a $C(CX_3)_2$ group (wherein X is halogen or hydrogen), a CO group, an O atom, an S atom, an $SO_2$ group, an $Si(R)_2$ group and an $N(R)$ group, and Es may be the same or different. In the above-mentioned E, R is at least one of a $C_{1-3}$ alkyl group and a halogenated $C_{1-3}$ alkyl group and present at a meta position or a para position with respect to a carbonyl functional group or a Y group.

Further, in the above formula (22), A and A' are substituents, and t and z respectively indicate the numbers of substitutions therein. Additionally, p is an integer from 0 to 3, q is an integer from 1 to 3, and r is an integer from 0 to 3.

The above-mentioned A is selected from the group consisting of, for example, hydrogen, halogen, a $C_{1-3}$ alkyl group, a halogenated $C_{1-3}$ alkyl group, an alkoxy group represented by OR (wherein R is the group defined above), an aryl group, a substituted aryl group by halogenation, a $C_{1-9}$ alkoxycarbonyl group, a $C_{1-9}$ alkylcarbonyloxy group, a $C_{1-12}$ aryloxycarbonyl group, a $C_{1-12}$ arylcarbonyloxy group and a substituted derivative thereof, a $C_{1-12}$ arylcarbamoyl group, and a $C_{1-12}$ arylcarbonylamino group and a substituted derivative thereof. When there are plural As, they may be the same or different. The above-mentioned A' is selected from the group consisting of, for example, halogen, a $C_{1-3}$ alkyl group, a halogenated $C_{1-3}$ alkyl group, a phenyl group and a substituted phenyl group and when there are plural A's, they may be the same or different. A substituent on a phenyl ring of the substituted phenyl group can be, for example, halogen, a $C_{1-3}$ alkyl group, a halogenated $C_{1-3}$ alkyl group or a combination thereof. The t is an integer from 0 to 4, and the z is an integer from 0 to 3.

Among the repeating units of the polyamide or polyester represented by the formula (22) above, the repeating unit represented by the general formula (23) below is preferable.

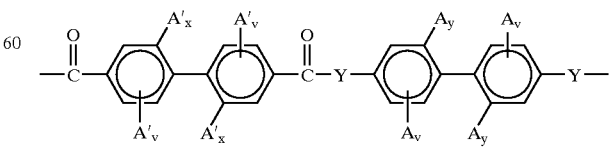

(23)

In the formula (23), A, A' and Y are those defined by the formula (22), and v is an integer from 0 to 3, preferably is an integer from 0 to 2. Although each of x and y is 0 or 1, not both of them are 0.

In the following, an example of a method for producing a liquid crystal cell substrate of the present invention will be described. First, one surface of the base is coated directly with a solution of the above-mentioned polymer, thus obtaining a coated surface. By a method capable of achieving a high thickness accuracy such as spin coating, flow-expanding, spraying, roller coating, flow coating, printing, dip coating, film flow-expanding, bar coating or gravure printing, one surface of a substrate is coated directly with a solution prepared by dissolving the above-mentioned polymer in a solvent, thus forming the coated surface.

The solvent of the polymer solution is not particularly limited as long as it can dissolve or suspend the polymer, and can be selected suitably according to a kind of the polymer. Examples thereof include halogenated hydrocarbons such as chloroform, dichloromethane, carbon tetrachloride, dichloroethane, tetrachloroethane, trichloroethylene, tetrachloroethylene, chlorobenzene and orthodichlorobenzene; phenols such as phenol and parachlorophenol; aromatic hydrocarbons such as benzene, toluene, xylene, methoxybenzene and 1,2-dimethoxybenzene; ketone-based solvents such as acetone, methyl ethyl ketone, methyl isobutyl ketone, cyclohexanone, cyclopentanone, 2-pyrrolidone and N-methyl-2-pyrrolidone; ester-based solvents such as ethyl acetate and butyl acetate; alcohol-based solvents such as t-butyl alcohol, glycerin, ethylene glycol, triethylene glycol, ethylene glycol monomethyl ether, diethylene glycol dimethyl ether, propylene glycol, dipropylene glycol and 2-methyl-2,4-pentanediol; amide-based solvents such as dimethylformamide and dimethylacetamide; nitrile-based solvents such as acetonitrile and butyronitrile; ether-based solvents such as diethyl ether, dibutyl ether and tetrahydrofuran; or carbon disulfide, ethyl cellosolve or butyl cellosolve. In particular, methylene chloride, cyclohexanone, trichloroethylene, tetrachloroethane, N-methylpyrrolidone, tetrahydrofuran and dimethylacetamide are preferable. These solvents may be used alone or in combination of two or more.

Considering a viscosity allowing an easy coating, it is appropriate to prepare the polymer solution by mixing 5 to 50 parts by weight, preferably 10 to 40 parts by weight of the polymer in 100 parts by weight of the solvent.

The thickness of the birefringent layer is not particularly limited, but ranges, for example, from 1 $\mu$m to 30 $\mu$m, preferably 1 $\mu$m to 20 $\mu$m. This is because a birefringent layer of at least 1 $\mu$m thick becomes excellent in optical compensation of a liquid crystal display, and that of not more than 30 $\mu$m thick achieves a still thinner liquid crystal display.

The thickness of the birefringent layer can be adjusted suitably by the concentration of the polymer solution or the amount of coating per area of the base, for example.

The birefringent layer produced by the present invention further may contain an organic silicon compound. This compound achieves an excellent adhesion between the birefringent layer and the substrate, so that an optically compensating layer with an improved adhesion can be formed easily. Thus, in the method of the present invention, an organic silicon compound may be added to the polymer solution.

There is no particular limitation on the organic silicon compound, and it is possible to use, for example, tetramethoxysilane, methyltrimethoxysilane, dimethyldimethoxysilane, tetraethoxysilane, methyltriethoxysilane, dimethyldiethoxysilane, isobutyltrimethoxysilane, phenyltrimethoxysilane, phenyltriethoxysilane, diphenyldimethoxysilane, diphenyldiethoxysilane, 3-methacryloxypropyltrimethoxysilane, 3-methacryloxypropylmethyldimethoxysilane, 3-methacryloxypropyltriethoxysilane, 3-methacryloxypropylmethyldiethoxysilane, decyltrimethoxysilane, n-hexadecyltrimethoxysilane, n-hexadecyldimethoxymethylsilane, stearyltrimethoxysilane, vinyltrimethoxysilane, vinyltriethoxysilane, vinyltris(2-methoxyethoxy)silane, N-(2-aminoethyl)3-aminopropyltrimethoxysilane, N-(2-aminoethyl)3-aminopropylmethyldimethoxysilane, 3-aminopropyltrimethoxysilane, N-phenyl-3-aminopropyltrimethoxysilane, 3-mercaptopropyltrimethoxysilane, 3-chloropropyltrimethoxysilane, 3-chloropropylmethyldimethoxysilane, 3-methacryloxypropyltrimethoxysilane, 3-methacryloxypropylmethyldimethoxysilane, 3-methacryloxypropyltriethoxysilane, 3-methacryloxypropylmethyldiethoxysilane, γ-glycidoxypropyltrimethoxysilane, γ-glycidoxypropylmethyldimethoxysilane, γ-glycidoxypropyltriethoxysilane, γ-glycidoxypropylmethyldiethoxysilane and 2-(3,4-epoxydicyclohexyl)ethyltrimethoxysilane. They may be used alone or in combination of two or more and added in an amount ranging from 0.001 to 5 parts by weight with respect to 100 parts by weight of the polymer, for example. The added amount of 0.001 parts by weight or more further improves adhesiveness, while that of 5 parts by weight or less further improves heat resistance.

In the polymer solution, various additives such as a stabilizer, a plasticizer, metal and the like further may be blended as necessary.

Moreover, the polymer solution may contain other resins as long as the orientation of the polymer does not drop considerably. Such resins can be, for example, resins for general purpose use, engineering plastics, thermoplastic resins and thermosetting resins.

The resins for general purpose use can be, for example, polyethylene (PE), polypropylene (PP), polystyrene (PS), polymethyl methacrylate (PMMA), an ABS resin, an AS resin or the like. The engineering plastics can be, for example, polyacetate (POM), polycarbonate (PC), polyamide (PA: nylon), polyethylene terephthalate (PET), polybutylene terephthalate (PBT) or the like. The thermoplastic resins can be, for example, polyphenylene sulfide (PPS), polyethersulfone (PES), polyketone (PK), polyimide (PI), polycyclohexanedimethanol terephthalate (PCT), polyarylate (PAR), liquid crystal polymers (LCP) or the like. The thermosetting resins can be, for example, epoxy resins, phenolic novolac resins or the like.

When the above-described other resins are blended in the polymer solution as mentioned above, the blend amount ranges, for example, from 0 wt % to 50 wt %, preferably from 0 wt % to 30 wt %, with respect to the polymer.

Next, in this method of the present invention, the coated surface is dried so as to obtain a birefringent layer. A drying method is not particularly limited but can be air drying or heat drying, for example. The conditions therefor can be determined suitably according to, for example, kinds of the polymer and the solvent. For instance, the temperature therefor usually is 25° C. to 400° C., preferably is 60° C. to 300° C., and further preferably is 100° C. to 200° C. The coated surface may be dried at a constant temperature or by gradually rising or lowering the temperature. The drying time also is not particularly limited but usually is 1 to 30 minutes, preferably 3 to 20 minutes, and further preferably 5 to 15 minutes.

The above-described producing method makes it possible to obtain a liquid crystal cell substrate of the present invention in which a birefringent layer is laminated. The birefringent layer in the liquid crystal cell substrate is a layer with a negative refractive index.

FIG. 1 is a schematic view more specifically showing by arrows optical axis directions of refractive indexes (nx, ny, nz) in the birefringent layer. The refractive indexes nx, ny, nz indicate refractive indexes in an X-axis direction, a Y-axis direction and a Z-axis direction, respectively, as mentioned above. As shown in this figure, the X axis corresponds to an axial direction exhibiting a maximum refractive index within a plane, the Y axis corresponds to an axial direction perpendicular to the X axis within the plane, and the Z axis corresponds to a thickness direction perpendicular to the X axis and the Y axis. When the refractive index is negative, this means that the layer has a property satisfying nx≈ny>nz.

Moreover, in accordance with the present invention, a liquid crystal cell substrate further including a polarizing plate is provided as the liquid crystal cell substrate.

The polarizing plate may be laminated on either the base or the birefringent layer laminated thereon in the liquid crystal cell substrate.

Moreover, the present invention provides a liquid crystal panel including two liquid crystal cell substrates, and a liquid crystal layer interposed between the two liquid crystal cell substrates. At least one of the two liquid crystal cell substrates is the liquid crystal cell substrate according to the present invention.

The structure of the liquid crystal panel is not particularly limited as long as it has the liquid crystal cell substrate of the present invention, but it is preferable that the base of the liquid crystal cell substrate according to the present invention is located in such a manner as to face the liquid crystal layer.

Also, it is preferable that the liquid crystal panel further has a polarizing plate. It is preferable that the polarizing plate is laminated on surfaces of both of the liquid crystal cell substrates.

Further, the present invention provides a method for producing a liquid crystal panel having a birefringent layer on one of surfaces of a liquid crystal cell. The method includes preparing the liquid crystal cell including two liquid crystal cell substrates and a liquid crystal layer interposed between the two liquid crystal cell substrates, producing a precursor layer of the birefringent layer by applying a solution of a polymer that hardens to form the birefringent layer, directly onto at least one surface of the two liquid crystal cell substrates, and producing the birefringent layer by hardening the precursor layer.

By the above-described method, it is possible to provide a liquid crystal panel having a birefringent layer on at least one surface of the two liquid crystal cell substrates in the liquid crystal cell.

In a liquid crystal panel produced according to the above producing method, the polymer layer is formed by flow-expanding or the like on a surface of the substrates, which is opposite to a surface contacting liquid crystal when the substrates formed of glass or plastics sandwich the liquid crystal, thereby forming the birefringent layer directly. Therefore, it is extremely easy to form an optically compensating layer that has a highly-uniform birefringence and an excellent adhesion to a substrate.

Furthermore, a liquid crystal panel further including a polarizing plate also can be provided as the liquid crystal panel. It is preferable that the polarizing plate is laminated on surfaces of both of the liquid crystal cell substrates.

For these liquid crystal cell substrate and polymer, those similar to the base and polymer described above can be used. The process of producing a coated surface and that of drying the coated surface so as to produce a birefringent layer also are similar to those described above.

A polarizer, which is an element of the polarizing plate used in the present invention, can be a suitable polarizer that is formed by subjecting a film formed of vinyl alcohol-based polymer, for example, polyvinyl alcohol or partially-formalized polyvinyl alcohol to suitable treatments such as a dyeing treatment by a dichroic material containing iodine or a dichroic dye, a stretching treatment and a cross-linking treatment in a suitable order and manner and that transmits linearly-polarized light when natural light enters. It also may be possible to use a polarizing film formed of polyene oriented films such as dehydrated polyvinyl alcohol and dehydrochlorinated polyvinyl chloride. Among them, polyvinyl alcohol-based film prepared by adsorbing iodine or a dichroic dye and orienting the film is used preferably. In particular, the film whose light transmittance and polarization degree are excellent is preferable. The thickness of the polarizer generally is 1 to 80 µm, though it is not limited to this.

A protective film for protecting the polarizer is attached to, for example, one side or both sides of the polarizer. The protective film is not particularly limited as long as it is an optically transparent polymer film. Specific examples of materials for such a transparent protective film can include cellulose-based resins such as triacetylcellulose, and transparent resins based on polyester, polycarbonate, polyamide, polyimide, polyethersulfone, polysulfone, polystyrene, polynorbornene, polyolefin, acrylic substances, acetate and the like. Thermosetting resins or ultraviolet-curing resins based on the acrylic substances, urethane, acrylic urethane, epoxy, silicones and the like can be used as well. Among them, a TAC film having a surface saponified with alkali or the like is preferable in light of the polarization property and durability.

Another example of the polymer film is described in JP 2001-343529 A (WO 01/37007). The polymer material used can be a resin composition containing a thermoplastic resin whose side chain has a substituted or unsubtituted imido group and a thermoplastic resin whose side chain has a substituted or unsubtituted phenyl group and nitrile group, for example, a resin composition containing an alternating copolymer of isobutene and N-methylene maleimide and an acrylonitrile-styrene copolymer. Alternatively, the polymer film may be formed by extruding the resin composition.

It is preferable that the protective layer is colorless. More specifically, a retardation value (Rth) of the film in its thickness direction as represented by the equation below preferably ranges from −90 nm to +75 nm, more preferably ranges from −80 nm to +60 nm, and particularly preferably ranges from −70 nm to +45 nm. When the retardation value is within the range of −90 nm to +75 nm, coloring (optical coloring) of the polarizing plate, which is caused by the protective film, can be solved sufficiently. In the equation below, nx, ny and nz are equivalent to those described above, and d indicates the thickness of this film.

$$Rth=\{[(nx+ny)/2]-nz\}\times d$$

The transparent protective layer further may have an optically compensating function. As such a transparent protective layer having the optically compensating function, it is possible to use, for example, a known layer used for preventing coloring caused by changes in a visible angle based on retardation in a liquid crystal cell or for widening a preferable viewing angle. Specific examples include various films obtained by stretching the above-described transparent resins uniaxially or biaxially, an oriented film of a liquid crystal polymer or the like, and a laminate obtained by providing an oriented layer of a liquid crystal polymer on a transparent base. Among the above, the oriented film of a liquid crystal polymer is preferable because a wide viewing angle with excellent visibility can be achieved. Particularly preferable is an optically compensating retardation plate obtained by supporting an optically compensating layer with the above-mentioned triacetylcellulose film or the like, where the optically compensating layer is made of an incline-oriented layer of a discotic or nematic liquid crystal polymer. This optically compensating retardation plate can be a commercially available product, for example, "WV film" manufactured by Fuji Photo Film Co., Ltd. Alternatively, the optically compensating retardation plate can be prepared by laminating two or more layers of the optical retardation film and a film support of triacetylcellulose film or the like so as to control the optical characteristics such as retardation.

The thickness of the transparent protective layer is not particularly limited but can be determined suitably according to retardation or a protection strength. In general, the thickness is not greater than 500 $\mu$m, preferably ranges from 5 to 300 $\mu$m, and more preferably ranges from 5 to 150 $\mu$m.

The transparent protective layer can be formed suitably by a known method such as a method of coating a polarizing film with the above-mentioned various transparent resins or a method of laminating the transparent resin film, the optically compensating retardation plate or the like on the polarizing film, or can be a commercially available product.

As long as the object of the present invention is not missed, a transparent protective film used for the protective layer may be subjected to a hard coating treatment, an antireflection treatment, treatments for anti-sticking, diffusion and anti-glaring and the like. The hard coating treatment aims to prevent scratches on the surfaces of the polarizing plate, and is a treatment of, for example, providing a hardened coating film that is formed of a curable resin and has excellent hardness and smoothness onto a surface of the transparent protective film. The curable resin can be, for example, ultraviolet-curing resins of silicone base, urethane base, acrylic, and epoxy base. The treatment can be carried out by a known method. The anti-sticking treatment aims to prevent adjacent layers from sticking to each other. The antireflection treatment aims to prevent reflection of external light on the surface of the polarizing plate, and can be carried out by forming a known antireflection film or the like.

The anti-glare treatment aims to prevent reflection of external light on the polarizing plate surface from hindering visibility of light transmitted through the polarizing plate. The anti-glare treatment can be carried out, for example, by providing microscopic asperities on a surface of a transparent protective film by a known method. Such microscopic asperities can be provided, for example, by roughening the surface by sand-blasting or embossing, or by blending transparent fine particles in the above-described transparent resin when forming the transparent protective layer.

The above-described transparent fine particles may be silica, alumina, titania, zirconia, stannic oxide, indium oxide, cadmium oxide, antimony oxide or the like. Other than the above, inorganic fine particles having an electrical conductivity or organic fine particles comprising, for example, crosslinked or uncrosslinked polymer particles can be used as well. The average particle diameter of the transparent fine particles ranges, for example, from 0.5 to 20 $\mu$m, though there is no specific limitation. In general, a blend ratio of the transparent fine particles preferably ranges from 2 to 70 parts by weight, and more preferably ranges from 5 to 50 parts by weight with respect to 100 parts by weight of the above-described transparent resin, though there is no specific limitation.

An anti-glare layer in which the transparent fine particles are blended can be used as the transparent protective layer itself or provided as a coating layer applied onto the transparent protective layer surface. Furthermore, the anti-glare layer also can function as a diffusion layer to diffuse light transmitted through the polarizing plate in order to widen the viewing angle (i.e., visually-compensating function).

The antireflection layer, the anti-sticking layer, the diffusion layer and the anti-glare layer mentioned above can be laminated on the polarizing plate, as an sheet of optical layers comprising these layers, separately from the transparent protective layer.

The method for laminating the birefringent layer and the polarizing plate is not particularly limited but can be a method using an adhesive, a sticking agent or the like suitably as long as it has a high transparency.

The kind of an adhesive etc. can be determined suitably depending on materials of the birefringent layer and the polarizing plate. The adhesive can be, for example, a polymer adhesive based on acrylic substances, vinyl alcohol, silicone, polyester, polyurethane or polyether, or a rubber-based adhesive. It also is possible to use an adhesive containing a water-soluble cross-linking agent of vinyl alcohol-based polymers such as boric acid, borax, glutaraldehyde, melamine and oxalic acid. The sticking agent and the adhesive mentioned above do not peel off easily even when being exposed to moisture or heat, for example, and have excellent light transmittance and polarization degree. More specifically, these sticking agent and adhesive preferably are PVA-based adhesives when the polarizing plate is a PVA-based film, in light of stability of adhering treatment. These sticking agent and adhesive may be applied directly to surfaces of the polarizing plate and the transparent protective layer, or a layer of a tape or a sheet formed of the sticking agent or adhesive may be arranged on the surfaces thereof. Further, when these sticking agent and adhesive are prepared as an aqueous solution, for example, other additives or a catalyst such as an acid catalyst may be blended as necessary. In the case of applying the adhesive, other additives or a catalyst such as an acid catalyst further may be blended in the aqueous solution of the adhesive. The thickness of the adhesive layer is not particularly limited but may be, for example, 1 to 500 nm, preferably 10 to 300 nm, and more preferably 20 to 100 nm. It is possible to adopt a known method of using an adhesive etc. such as an acrylic polymer or a vinyl alcohol-based polymer without any particular limitations. Moreover, since it becomes possible to form a polarizing plate that does not peel off easily by moisture or heat and has excellent light transmittance and polarization degree, it is preferable that the adhesive further contains a water-soluble cross-linking agent of PVA-based polymers such as boric acid, borax, glutaraldehyde, melamine and oxalic acid. These adhesives can be used, for example, by applying its aqueous solution to the surface of each article mentioned above, followed by drying. In the above aqueous solution, other additives or a catalyst such as an acid catalyst may be blended as necessary. Among these, the adhesive preferably is a PVA-based adhesive because an excellent adhesiveness to a PVA film can be achieved.

It is preferable that a liquid crystal cell substrate on which a birefringent layer is laminated and a liquid crystal panel on which a birefringent layer is laminated according to the present invention are used for forming various apparatus such as a liquid crystal display. For example, a liquid crystal panel is formed by arranging a polarizing plate on one side or both sides of the liquid crystal panel and then used in a reflection-type or semi-transmission-type liquid crystal display or a liquid crystal display for dual transmission/reflection use.

In the present invention, the kind of the liquid crystal display is not limited specifically, but may be any desired type such as a thin-film transistor type active-matrix driving system or a simple-matrix driving system. Further, at the time of an actual use of the liquid crystal display, other optical members can be laminated on the liquid crystal cell and used. Such optical members are not particularly limited but can be one layer or two or more layers of suitable optical members that are often used for forming a liquid crystal display, for example, a reflection plate, a semi-transmission reflection plate, a retardation plate, a viewing angle compensating film and a brightness enhancement film.

When polarizing plates or optical members are arranged on both sides of a liquid crystal cell, the polarizing plates or the optical members can be the same or different. Moreover, for forming a liquid crystal display, one layer or two or more layers of suitable parts such as a prism array sheet, a lens array sheet, an optical diffuser and a backlight can be arranged at suitable positions.

The liquid crystal display according to the present invention is not limited specifically as long as it includes a liquid crystal cell substrate on which a birefringent layer is laminated or a liquid crystal panel on which a birefringent layer is laminated according to the present invention and uses the liquid crystal cell substrate and the liquid crystal panel according to the present invention as the substrate or liquid crystal panel described above. Also, it further can include a light source, and although there is no specific limitation on this light source, a flat surface light source emitting polarized light is preferable, for example, because light energy can be utilized effectively.

For the liquid crystal display according to the present invention, it also is possible to further dispose a diffusion plate, an anti-glare layer, an antireflection film, a protective layer/plate, on a birefringent layer on the viewing side. Alternatively, a retardation plate for compensation or the like can be disposed suitably between a liquid crystal cell and a polarizing plate in the liquid crystal panel.

Incidentally, a substrate on which a birefringent layer is laminated or a liquid crystal cell on which a birefringent layer is laminated according to the present invention is not limited to a use in the liquid crystal display described above. Other than the above, in self-light-emitting displays such as an organic electroluminescence (EL) display, a PDP and an FED, the liquid crystal cell substrate of the present invention can be used instead of a conventionally used substrate.

EXAMPLES

The following is a more specific description of the present invention by way of examples and comparative examples, though the present invention is by no means limited to the examples below.

Example 1

Polyimide having a weight-average molecular weight (Mw) of 70,000 was first synthesized from 2,2'-bis (trifluoromethyl)-4,4',5,5'-biphenyl tetracarboxylic dianhydride and 2,2'-bis(trifluoromethyl)-4,4'-diaminobiphenyl, and then a 10 wt % solution of this polyimide was prepared using cyclohexanone as a solvent.

A glass surface (thickness: 0.7 mm) obtained by removing a polarizing plate with a retardation plate [name: EF-HG1425DU] from a commercially available vertically oriented mode liquid crystal display (manufactured by FUJITSU LTD.) was subjected to ultrasonic cleaning using isopropyl alcohol as a cleaning agent. On the resultant surface, the above-described polyimide solution was applied by spin coating, followed by drying at 100° C. for 10 minutes.

A polyimide film formed on the glass surface had a thickness of 6 µm and was a birefringent layer whose $Rth=\{[(nx+ny)/2]-nz\} \times d$ was 150 nm.

Figure 2:
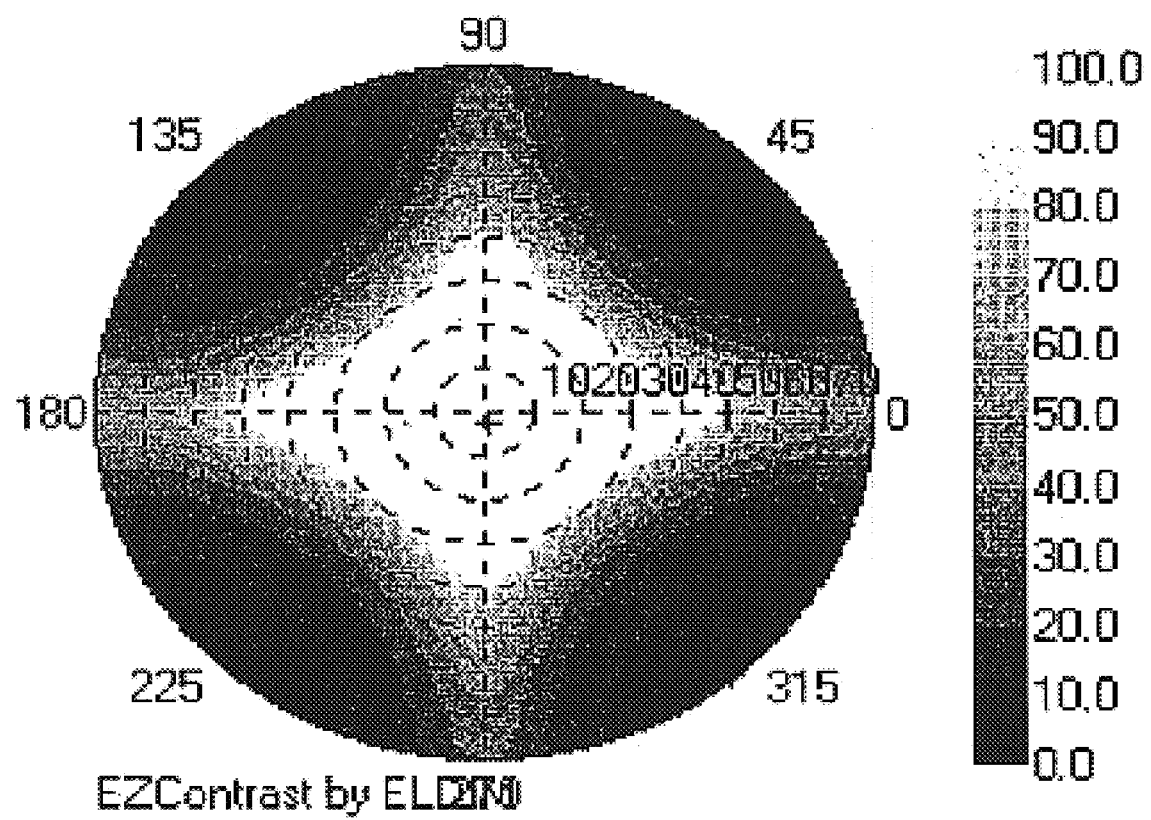
FIG. 2 shows an isocontrast curve of liquid crystal panels of Examples 1 and 2 and Comparative Examples 1 and 2.

A sticky polarizing plate HEG1425DU (manufactured by Nitto Denko Corporation) was attached to a surface of the polyimide film, so as to be provided in the liquid crystal display. Then, an isocontrast curve was measured by "EZContrast (trade name)" (manufactured by ELDIM SA.), thus examining viewing angle characteristics of the above-described display. From the results, it was found that the viewing angle characteristics after mounting the birefringent layer and polarizing plate were substantially equivalent to those in a liquid crystal display (manufactured by FUJITSU LTD.) before removing the polarizing plate with the retardation plate [name: EF-HG1425DU], as shown in FIG. 2.

Evaluating light leakage and thermal stability of the obtained liquid crystal display produced the results shown in Table 1. The light leakage was examined by allowing the liquid crystal display to stand at 50° C. for 100 hours and visually checking the light leakage from corners of a display screen. In the table, "Good" means that no light leakage was found, while "Bad" means that light leakage was found. The thermal stability was examined by allowing the liquid crystal display to stand at 100° C. for 100 hours and visually checking an interface between the glass surface and the birefringent layer. In the table, "Good" means that peeling-off of the birefringent layer was not found, while "Bad" means that peeling-off of the birefringent layer was found.

Example 2

Polyimide having a weight-average molecular weight (Mw) of 50,000 was first synthesized from 3,3',4,4'-biphenyl tetracarboxylic dianhydride and 2,2'-bis(trifluoromethyl)-4, 4'-diaminobiphenyl, and then a 10 wt % solution of this polyimide was prepared using dimethylacetamide as a solvent.

By the same operation as Example 1 except that this polyimide solution was used, a polyimide film was formed on a glass surface. The obtained polyimide film had a thickness of 5 µm and was a birefringent layer whose $Rth=\{[(nx+ny)/2]-nz\} \times d$ was 130 nm as in Example 1.

When a mounting evaluation similar to that in Example 1 was conducted, the isocontrast curve of the liquid crystal panel was found to be equivalent to that in Example 1 as shown in FIG. 2. The light leakage and thermal stability of the obtained liquid crystal display are shown in Table 1. The testing method was similar to that in Example 1.

Example 3

By the same operation as Example 1 except that 1 wt % of γ-glycidoxypropyltrimethoxysilane with respect to solids of the polyimide solution prepared in Example 1 was added to the polyimide solution, a polyimide film was formed on a glass surface. The obtained polyimide film had a thickness of 6 μm and was a birefringent layer whose Rth={[(nx+ny)/2]-nz}×d was 130 nm.

On the obtained polyimide film, a crosscut tape peeling test (JIS K 5400 test method) was conducted. It was then found that no peeling occurred in both a heat resistance test at 80° C. for 500 hours and a moisture/heat resistance test at 60° C. at 90% RH for 500 hours. When a mounting evaluation similar to that in Example 1 was conducted, the isocontrast curve of the liquid crystal panel was found to be equivalent to those in Examples 1 and 2 as shown in FIG. 2. The light leakage and thermal stability of the obtained liquid crystal display are shown in Table 1. The testing method was similar to that in Example 1.

Comparative Example 1

Panlite (trade name) (manufactured by TEIJIN LIMITED), which is a polycarbonate film, was subjected to a longitudinal stretching and a fixed-end transverse stretching at 175° C., thus obtaining a 80 μm thick birefringent film whose Rth={[(nx+ny)/2]nz} xd-was 130 nm. Except that this birefringent film was attached to the glass surface prepared in Example 1 using an acrylic sticking agent with a thickness of 23 μm, the mounting evaluation similar to those in Examples 1 to 3 was carried out. From the results of this evaluation, it was found that the isocontrast curve of the liquid crystal panel was equivalent to those in Examples 1 and 3 as shown in FIG. 2. The light leakage and thermal stability of the obtained liquid crystal display are shown in Table 1. The testing method was similar to that in Example 1.

Comparative Example 2

The polyimide solution prepared in Example 1 was applied to a 100 μm thick polyethylene terephthalate film by spin coating, followed by drying at 100° C. for 10 minutes. Subsequently, the polyimide film (thickness: 6 μm) was peeled off from the polyethylene terephthalate film.

Next, except that the above-mentioned polyimide film was attached to the glass surface prepared in Example 1 using an acrylic sticking agent with a thickness of 23 μm, the mounting evaluation similar to those in Examples 1 to 3 was carried out. From the results of this evaluation, it was found that the isocontrast curve of the liquid crystal panel was equivalent to those in Examples 1 and 3 as shown in FIG. 2. The light leakage and thermal stability of the obtained liquid crystal display are shown in Table 1. The testing method was similar to that in Example 1.

TABLE 1

|  | Light leakage | Thermal stability |
| --- | --- | --- |
| Example 1 | Good | Good |
| Example 2 | Good | Good |
| Example 3 | Good | Good |
| Comparative Example 1 | Bad | Bad |
| Comparative Example 2 | Good | Bad |

As described above, in accordance with the present invention, by a method of producing a birefringent layer directly on a liquid crystal cell substrate or a liquid crystal cell substrate of a liquid crystal panel, it becomes extremely easy to form an optically compensating layer that has high uniformity and adhesion. This makes it possible to produce a wide viewing angle liquid crystal display with extremely good productivity.

What is claimed is:

1. A method for producing a liquid crystal cell substrate comprising a base and a birefringent layer, the method comprising:
    producing a precursor layer of the birefringent layer by applying a solution of a polymer that hardens to form the birefringent layer, directly onto one surface of the base; and
    producing the birefringent layer by hardening the precursor layer.

2. The method for producing a liquid crystal cell substrate according to claim 1, wherein the polymer is at least one selected from the group consisting of polyamide, polyimide, polyester, polyetherketone, polyaryletherketone, polyamide imide and polyesterimide.

3. The method for producing a liquid crystal cell substrate according to claim 1, wherein the solution of the polymer further comprises an organic silicon compound.

4. The method for producing a liquid crystal cell substrate according to claim 1, wherein the substrate is glass or plastic.

5. The method for producing a liquid crystal cell substrate according to claim 4, wherein the plastic is plastic of polyester, polyarylate, polycarbonate, polysulfone, polyethersulfone, an epoxy resin or polynorbornene.

6. A liquid crystal cell substrate produced by the method according to claim 1, comprising:
    a base; and
    a birefringent layer formed directly on the base.

7. The liquid crystal cell substrate according to claim 6, further comprising a polarizing plate.

8. A liquid crystal panel comprising:
    two liquid crystal cell substrates; and
    a liquid crystal layer interposed between the two liquid crystal cell substrates;
    wherein at least one of the two liquid crystal cell substrates is the liquid crystal cell substrate according to claim 6.

9. A liquid crystal panel comprising:
    two liquid crystal cell substrates; and
    a liquid crystal layer interposed between the two liquid crystal cell substrates;
    wherein at least one of the two liquid crystal cell substrates is the liquid crystal cell substrate according to claim 6,
    wherein the base of the liquid crystal cell substrate according to claim 6 faces the liquid crystal layer.

10. The liquid crystal panel according to claim 8, further comprising a polarizing plate.

11. A method for producing a liquid crystal panel having a birefringent layer on one of surfaces of a liquid crystal cell, the method comprising:
    preparing the liquid crystal cell comprising
        two liquid crystal cell substrates, and
        a liquid crystal layer interposed between the two liquid crystal cell substrates;
    producing a precursor layer of the birefringent layer by applying a solution of a polymer that hardens to form the birefringent layer, directly onto at least one surface of the two liquid crystal cell substrates; and producing the birefringent layer by hardening the precursor layer.

12. The method for producing a liquid crystal panel according to claim 11, wherein the polymer is at least one selected from the group consisting of polyamide, polyimide, polyester, polyetherketone, polyaryletherketone, polyamide imide and polyesterimide.

13. The method for producing a liquid crystal panel according to claim 11, wherein the solution of the polymer further comprises an organic silicon compound.

14. The method for producing a liquid crystal panel according to claim 11, wherein the two liquid crystal cell substrates independently are glass or plastic.

15. The method for producing a liquid crystal panel according to claim 14, wherein the plastic is plastic of polyester, polyarylate, polycarbonate, polysulfone, polyethersulfone, an epoxy resin or polynorbornene.

16. A liquid crystal panel produced by the method according to claim 11.

17. The liquid crystal panel according to claim 16, further comprising a polarizing plate.

18. The liquid crystal panel according to claim 17, wherein the polarizing plate is laminated on the birefringent layer.

19. A liquid crystal display comprising the liquid crystal cell substrate according to claim 6.

20. A liquid crystal display comprising the liquid crystal panel according to claim 16.

* * * * *